US008698029B2

(12) United States Patent
Scuderi et al.

(10) Patent No.: US 8,698,029 B2
(45) Date of Patent: Apr. 15, 2014

(54) TOUCH SENSOR AND METHOD OF FORMING A TOUCH SENSOR

(75) Inventors: Antonino Scuderi, Misterbianco (IT); Ezio Perrone, Munich (DE)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 0 days.

(21) Appl. No.: 13/164,394

(22) Filed: Jun. 20, 2011

(65) Prior Publication Data

US 2012/0325639 A1 Dec. 27, 2012

(30) Foreign Application Priority Data

Jun. 21, 2010 (IT) .............................. VI2010A0177

(51) Int. Cl.
*H03K 17/975* (2006.01)
(52) U.S. Cl.
USPC .......................................... 200/600; 345/174
(58) Field of Classification Search
USPC ........................................................ 200/600
See application file for complete search history.

(56) References Cited

U.S. PATENT DOCUMENTS

| | | | |
|---|---|---|---|
| 4,888,733 A | 12/1989 | Mobley | |
| 5,086,412 A | 2/1992 | Jaffe et al. | |
| 6,091,621 A | 7/2000 | Wang et al. | |
| 6,297,811 B1 | 10/2001 | Kent et al. | 345/173 |
| 6,335,550 B1 | 1/2002 | Miyoshi et al. | |
| 6,819,583 B2 | 11/2004 | Hsu et al. | |
| 2007/0240910 A1 | 10/2007 | Kembaiyan et al. | 175/374 |
| 2007/0240914 A1 | 10/2007 | Lai et al. | |
| 2009/0002337 A1 | 1/2009 | Chang | 345/174 |
| 2009/0309850 A1 | 12/2009 | Yang | 345/174 |
| 2010/0134436 A1 | 6/2010 | Jeong et al. | 345/174 |
| 2012/0127099 A1* | 5/2012 | Liu et al. | 345/173 |

FOREIGN PATENT DOCUMENTS

| | | | |
|---|---|---|---|
| EP | 2148264 | 1/2010 | G06F 3/041 |
| GB | 2435998 | 9/2007 | G01D 5/24 |

OTHER PUBLICATIONS

Cho et al., "Terabit inch-2 ferroelectric data storage using scanning nonlinear dielectric microscopy nanodomain engineering system", Institute of Physics Publishing, Nanotechnology No. 14, 2003, 637-642.
Yoshihisa Kato, "0.18-μm nondestructive readout FeRAM using charge compensation technique", IEEE Transactions on electron devices, vol. 52 No. 12, 2005, 2016-2021.

* cited by examiner

*Primary Examiner* — Renee Luebke
*Assistant Examiner* — Ahmed Saeed
(74) *Attorney, Agent, or Firm* — Allen, Dyer, Doppelt, Milbrath & Gilchrist, P.A.

(57) ABSTRACT

A touch sensor includes a substrate having a substrate surface and first electrode sets. Each first electrode set has a plurality of electrodes formed over the substrate surface and arranged in a row along a first direction, the electrodes being transparent and formed of a first material, the first material being electrically conductive and light transmissive. Each first electrode set also has connection elements. Each connection element provides an electrical connection between a pair of adjacent ones of the plurality of electrodes. The connection elements are formed of a second material having a smaller specific electric resistance than the first material. Each of the connection elements comprises a first portion, a second portion and a third portion. The third portion provides an electrical connection between the first portion and the second portion.

22 Claims, 4 Drawing Sheets

TOUCH SENSOR AND METHOD OF FORMING A TOUCH SENSOR

FIELD OF THE INVENTION

The present invention relates to touch sensors and methods of forming touch sensors, which can, for example, be used in touch screens and/or touch panels.

BACKGROUND OF THE INVENTION

Touch screens are well established computer input devices. The use of touch screens includes, for example tablet computer applications, mobile phone applications, media player applications, point of sale applications, point of information applications, ticket automat applications, to just mention a few of the most popular usages. As touch screen technology matures, the range of applications may further increase.

Commercially available touch screens utilize a variety of different touch detection mechanisms. These touch detection mechanisms may include an interruption of infrared optical beams, electrical contact to a voltage gradient on a transparent resistive coating via flexing of a flexible cover sheet, absorption of ultrasonic acoustic waves along the touch screen surface, capacitive shunting of an alternating current through either a very thin or a thick dielectric layer to the user's finger or a stylus held by the user, and then through the user's body to ground, as well as a detection of a touch of the touch screen via force sensors supporting corners of the screen.

Capacitive touch sensors for detecting the touch of a touch screen can provide a good spatial resolution, a fast response time and the ability to operate even in the presence of surface contamination. Capacitive touch sensors comprise a set of electrical conductors that form electrical fields extending into an active sensor area accessible to a user if an electric voltage is applied thereto. The tissue of the human body is filled with conductive electrolytes covered by a layer of skin, which is a lossy dielectric. When a finger of the user is brought into the proximity of the electrodes of a capacitive touch sensor, due to its electrical conductivity, the finger of the user interacts with the electrical field created by the electrodes. This interaction can lead to a change of the electrical capacity between a pair of electrodes of the capacitive touch sensor that can be used to detect the presence of the user's finger in the vicinity of the capacitive touch sensor and a position of the finger.

U.S. Pat. Pub. 2009/0002337 discloses a capacitive touch panel according to the state of the art. The touch panel includes a transparent substrate, a plurality of first conductors, a plurality of second conductors cooperating with the first conductors to form a matrix of capacitive regions, and a controller electrically connected to the first and second conductors for detecting the capacitate of each of the capacitive regions. Each of the first conductors is intersected and divided by the second conductors into a series of first electrodes sections. Each of the second conductors is intersected and divided by the first conductors into a series of second electrode sections. Each of the first and second electrode sections of the first and second conductors has a fine conductor line-constructed structure which is constructed from a fine line-shaped conductor.

U.S. Pat. Pub. 2007/0240914 discloses a transparent touch panel according to the prior art. The touch panel comprises a transparent substrate, a capacitive touch device positioned on the transparent substrate, an interfacial structure positioned on the capacitive touch device, and a display device positioned on the interfacial structure. The capacitive touch device includes a plurality of first sensing blocks positioned on the transparent substrate, a dielectric layer covering the first sensing blocks, a plurality of second sensing blocks positioned on the dielectric layer, a plurality of first wires positioned on the transparent substrate, and a plurality of second wires positioned on the dielectric layer. Preferably, the first sensing blocks and the second sensing blocks are interlaced, each first wire connects the first sensing blocks on the same column, and each second wire connects the second sensing blocks on the same row.

U.S. Pat. No. 6,297,811 discloses a touch screen according to the prior art. The touch screen utilizes two sets of electrodes that are fabricated in a single plane. The individual electrodes of each set of electrodes are formed from a continuous length of a conductive material. Suitable electrode materials include fine wire and deposited conductive coatings. The overall electrode pattern is such that there may be no overlap of electrodes, thus eliminating or reducing the use of insulating layers and/or coatings between electrodes. The electrodes can have a triangular shape, wherein the base of one triangularly shaped electrode is adjacent to the apex of the next triangularly shaped electrode.

U.S. Pat. Pub. 2009/0309850 discloses a capacitive touch panel according to the prior art. The capacitive touch panel comprises a substrate layer, a sensing layer, and a surface layer. A plurality of transparent X and Y axis traces are arranged on the sensing layer and intersect each other as a matrix. A front end of each X trace and each Y trace has a joint. The plurality of X axis traces and Y axis traces are arranged at the same plane. Each X axis trace includes a plurality of induction-spots and each Y axis trace includes a plurality of induction-spots. The induction-spots of one X axis trace are connected one by one, while the induction-spots of one Y axis trace are formed separately with gaps. The adjacent induction-spots of the Y axis trace are connected by a bridge structure and induction-spots of the Y axis trace are insulated to the respective one of the plurality of X axis traces.

GB 2435998 discloses a capacitive sensor according to the prior art for determining the presence of an object, such as a user's finger or a stylus. The sensor comprises a substrate, on which electrodes are deposited. A resistive drive electrode, for example formed of transparent indium tin oxide, is arranged on one side of the substrate and a resistive sense electrode which again may be of transparent indium tin oxide, is arranged on the other side of the substrate. Thus an overall transparent sensor can be provided. A shorting connection is also provided which is configured to connect between two locations on one of the electrodes. By providing the shorting connection between locations on one or both of the electrodes, a lower resistance connection is provided between other locations on the electrode and the corresponding drive or sense channel. This may reduce "walk by" interference. A grounding electrode is also incorporated.

Since touch sensors for touch screens and/or touch panels are used in front of a screen for detecting the position of the finger of a user or a stylus touching the screen, touch sensors are made transparent for allowing the user to view the screen through the touch sensor. For improving the sensitivity and speed of operation of the touch sensor, a high electrical conductivity of electrodes of the touch sensor is desirable. However, materials having a low specific electrical resistance such as, for example, metals are opaque. Transparent electrically conductive materials such as indium tin oxide have a specific electrical resistance that is substantially greater than the specific electrical resistance of metals. Hence, for providing the same electrical resistance as a metal electrode, the cross-sectional area of an electrode formed from a transparent electrically conductive material may be substantially greater than the cross-sectional area of the metal electrode.

Since the thickness of an electrode formed over a screen is limited due to the requirement of reducing absorption of light in the electrode, a relatively large width of the electrodes in a direction perpendicular to the direction of electrical current flow through the electrode can be useful.

In electrode crossing portions of a touch sensor wherein electrodes to which different voltages are applied in the operation of the touch sensor overlap with each other, a configuration similar to that of a plate capacitor is obtained. In such regions, relatively strong electrical fields can be formed in a region between the electrodes, whereas relatively low electrical fields extending to regions outside the sensor where they can interact with the finger of a user or a stylus are obtained. Therefore, it can be desirable to reduce the size of regions wherein electrodes are located above each other. Since, however, as mentioned above, electrodes formed from a transparent electrically conductive material typically have a relative large width it can be difficult to reduce the size of electrode crossing portions in touch sensors using electrodes formed from a transparent electrically conductive material.

Approaches wherein an overlap of electrodes is avoided by forming electrodes extending parallel to each other in a longitudinal direction, such as, for example, the touch screen described in U.S. Pat. No. 6,297,811 can have the disadvantage of a relatively small spatial resolution in the longitudinal direction of the electrodes.

Forming electrodes from metal wires as, for example, disclosed in U.S. Pat. Pub. 2009/0002337 has the disadvantage that the wires may cover a small portion of the area of the screen, since otherwise the wires might obstruct the user's view of the screen.

In U.S. Pat. Pub. 2009/0309850, it has been proposed to provide a bridge structure comprising silver conducting wires for connecting induction-spots formed from a transparent electrically conductive material. However, this approach can lead to a relatively large electrical resistance and relatively large fluctuations of the electrical resistance of the electrically conductive path formed by the induction-spots and the wires.

SUMMARY OF THE INVENTION

It is an object of the present invention to provide a touch sensor wherein some or all of the above-mentioned problems of the prior art are overcome.

A touch sensor according to the present invention comprises a substrate having a substrate surface and one or more first electrode sets. Each first electrode set comprises a plurality of electrodes formed over the substrate surface and arranged in a row along a first direction. The electrodes are transparent and formed of a first material. The first material is electrically conductive and light transmissive. Each first electrode set further comprises one or more connection elements. Each connection element provides an electrical connection between a pair of adjacent ones of the plurality of electrodes of the respective first electrode set. The one or more connection elements are formed of a second material having a smaller specific electric resistance than the first material. Each of the connection elements comprises a first portion, a second portion and a third portion. The third portion provides an electrical connection between the first portion and the second portion.

A projection of the first portion onto the substrate surface along a surface normal perpendicular to the substrate surface is within a projection of a first one of the pair of electrodes electrically connected by the connection element onto the substrate surface along the surface normal. A projection of the second portion onto the substrate surface along the surface normal is within a projection of the second one of the pair of electrodes connected by the connection element onto the substrate surface along the surface normal. A dimension of the third portion in a second direction perpendicular to the first direction and the surface normal is smaller than a dimension of the first portion in the second direction and a dimension of the second portion in the second direction.

In the touch sensor disclosed herein, an electrical current can flow from the first one of the pair of electrodes connected by a particular connection element to the third portion of the connection element via the first portion of the connection element, and can flow from the third portion to the second one of the pair of electrodes via the second portion of the connection element. Due to the greater dimension of the first and the second portion of the connection element in the second direction as compared to the third portion, the current can flow through a greater cross sectional area of first material in the electrodes adjacent the first and second portion than in the case of a connection between the connection element and the electrodes having the same dimension in the second direction as the third portion of the connection element. Hence, the electrical resistance of the first electrode sets can be reduced.

Arranging the first portion and the second portion of the connection elements such that a projection of the respective portion onto the substrate surface along a surface normal perpendicular to the substrate surface is within a projection of one of the pair of electrodes electrically connected by the connection element onto the substrate surface along the surface normal may ensure that the first and second portions of the connection elements are surrounded by the first material of the electrodes, which can help to improve the electrical contact between the electrodes and the first and second portions of the connection elements, and can also help to reduce adverse effects of alignment errors between the connection elements and the electrodes.

Hence, such a touch sensor can provide a reduced electrical resistance of the first electrode sets, and can also provide smaller fluctuations between the electrical resistances of individual first electrode sets in the touch sensor.

In some embodiments, a dimension of the third portions of the connection elements in the first direction may be greater than a dimension of the first and second portions of the connection elements in the first direction. Thus, the first, second and third portions of the connection elements can obtain an elongated shape, with the direction of elongation of the third portions being in the first direction and the direction of elongation of the first and second portions being in the second direction. This can reduce the absorption of light by the connection elements and the visibility of the connection elements for the user.

In some embodiments, a dimension of the first portion in the first direction, a dimension of the second portion in the first direction and/or a dimension of the third portion in the second direction are less than or equal to 15 micrometers. Thus, the first, second and third portions of the connection elements are narrow lines which are substantially invisible to the human eye.

In some embodiments, each of the first, second and third portions of the connection elements has a rectangular shape, wherein a longer side of the first portion and a longer side of the second portion extend in the second direction, and a longer side of the third portion extends in the first direction. Thus, an H-shape of the connection elements is obtained, which can allow a particularly efficient reduction of the electrical resistivity of the first electrode sets, and a particularly efficient reduction of fluctuations of the electrical resistivity between the first electrode sets.

In some embodiments, each of the electrodes has a rhombus shape, one of the diagonals of the rhombus extending in the first direction, the other of the diagonals of the rhombus extending in the second direction. A rhombus shape of the electrodes can allow a particularly precise detection of the location of a finger of the user or a stylus.

In some embodiments, the touch sensor further comprises one or more second electrode sets. Each second electrode set comprises a plurality of electrodes arranged in a row along the second direction. The electrodes are transparent and formed from the first material. Additionally, each second electrode set comprises one or more connection elements. Each connection element provides an electrical connection between a pair of adjacent ones of the plurality of electrodes. For detecting a position of the finger of a user or a stylus, the capacity between electrodes of the first electrode sets and the second electrode sets can be measured, which can allow a particularly precise detection of the position of the user's finger or the stylus, respectively.

In some embodiments, at least portions of the electrodes of the one or more second electrode sets are formed on a same surface as at least portions of the electrodes of the one or more first electrode sets, and each of the third portions of the connection elements of the one or more first electrode sets is at least partially located above or below one of the connection elements of the one or more second electrode sets and separated therefrom by an insulating layer. Thus, the electrodes of the first electrode sets and the electrodes of the second electrode sets can be formed simultaneously by depositing a layer of the first material over the substrate and patterning the layer of the first material. Thus, the complexity of the manufacturing process of the touch sensor can be reduced. Crossings of the electrical paths provided by the first electrode sets and second electrode sets are provided by the portions of third portions of the connection elements of the first electrode sets located above or below the connection elements of the second electrode sets. Since the third portions of the connection elements are formed from the second material having a relatively small specific electrical resistance, and, hence, can have a small width while still having a sufficiently small electrical resistance, the overlap area between the first electrode sets and the second electrode sets can be made small.

In some embodiments, the connection elements of the one or more second electrode sets are formed from the first material, and a dimension of the connection elements of the one or more second electrode sets in the first direction is greater than a dimension of the third portions of the connection elements of the one or more first electrode sets in the second direction. Thus, the connection elements of the second electrode sets can be formed simultaneously with the electrodes of the first and second electrode sets. Hence, additional manufacturing steps may not need to be used for forming the connection elements of the second electrode sets, which can reduce the complexity of the manufacturing process. By providing a greater dimension of the connection elements of the second electrode sets in the first direction, the cross sectional area through which a current flowing through the second electrode sets is flowing can be increased, which allows a reduction of the electrical resistance of the second electrode sets in spite of the relatively high specific electrical resistance of the first material from which the connection elements of the second electrode sets are formed.

In other embodiments, at least one electrically insulating layer is formed between a first surface on which the electrodes of the one or more first electrodes sets are formed and a second surface on which the electrodes of the one or more second electrode sets are formed. Thus, an alternative to forming the electrodes of the first and second electrode sets on the same surface is provided.

In some embodiments, pairs of adjacent electrodes of each of the first electrode sets are electrically connected by transparent electrode connector portions formed from the first material in addition to being electrically connected by the connection elements of the respective first electrode set. Thus, both the transparent electrode connector portions and the connection elements provide an electrical conductivity between pairs of adjacent electrodes. This can help to further reduce the electrical resistance of the electrical connection between adjacent electrodes.

In some embodiments, each of the connection elements of each of the second electrode sets is formed from the second material and comprises a first portion, a second portion and a third portion, the third portion providing an electrical connection between the first portion and the second portion. A projection of the first portion onto the substrate surface along a surface normal perpendicular to the substrate surface is within a projection of a first one of the pair of electrodes connected by the connection element onto the substrate surface along the surface normal.

A projection of the second portion onto the substrate surface along the surface normal is within a projection of the second one of the pair of electrodes connected by the connection element onto the substrate surface along the surface normal. A dimension of the third portion in the first direction is smaller than a dimension of the first portion in the first direction and a dimension of the second portion in the first direction. Thus, advantages similar to those discussed above in the context of the electrical connections between the electrodes of the first electrode sets can be provided also in the second electrode sets.

In some embodiments, pairs of adjacent electrodes of each of the second electrode sets are electrically connected by transparent electrode connector portions formed from the first material in addition to being electrically connected by the connection elements of the respective second electrode set. Thus, a further reduction of the electrical resistance of connections between the electrodes of the second electrode sets can be obtained.

The touch sensor can further comprise a control circuit and a plurality of electrically conductive lines comprising the second material, each of the electrically conductive lines providing an electrical connection between the control circuit and one of the first electrode sets or one of the second electrode sets. By providing the second material which has a lower specific electrical resistance than the first material in the electrically conductive lines, the electrical resistivity of the electrically conductive lines can be reduced.

In some embodiments, each of the electrically conductive lines comprises a layer of the first material in addition to a layer of the second material. This can help to further reduce the electrical resistivity of the electrically conductive lines.

A method of forming a touch sensor comprises providing a substrate having a substrate surface. One or more first electrode sets are formed. The formation of each first electrode set comprises forming a plurality of electrodes over the substrate surface. The electrodes are arranged in a row along a first direction, are transparent and are formed of a first material. The first material is electrically conductive and light transmissive. The formation of each first electrode set further comprises forming one or more connection elements. Each connection element provides an electrical connection between a pair of adjacent ones of the plurality of electrodes.

The one or more connection elements are formed of a second material having a smaller specific electrical resistance than the first material. Each of the connection elements comprises a first portion, a second portion and a third portion. The third portion provides an electrical connection between the first portion and the second portion.

A projection of the first portion onto the substrate surface along a surface normal perpendicular to the substrate surface is within a projection of a first one of the pair of electrodes electrically connected by the connection element onto the substrate surface along the surface normal. A projection of the second portion onto the substrate surface along the surface normal is within a projection of the second one of the pair of electrodes connected by the connection element onto the substrate surface along the surface normal. A dimension of the third portion in a second direction perpendicular to the first direction and the surface normal is smaller than a dimension of the first portion in the second direction and a dimension of the second portion in the second direction.

BRIEF DESCRIPTION OF THE DRAWINGS

Embodiments of the present invention will be described in the following with reference to the figures of the present application, wherein

FIG. 2b shows a schematic cross-sectional view of the electrode crossing portion shown in FIG. 2a;

FIGS. 4b and 4c show a schematic cross-sectional views of the electrode crossing portion shown in FIG. 4a.

DETAILED DESCRIPTION OF THE PREFERRED EMBODIMENTS

Figure 1:
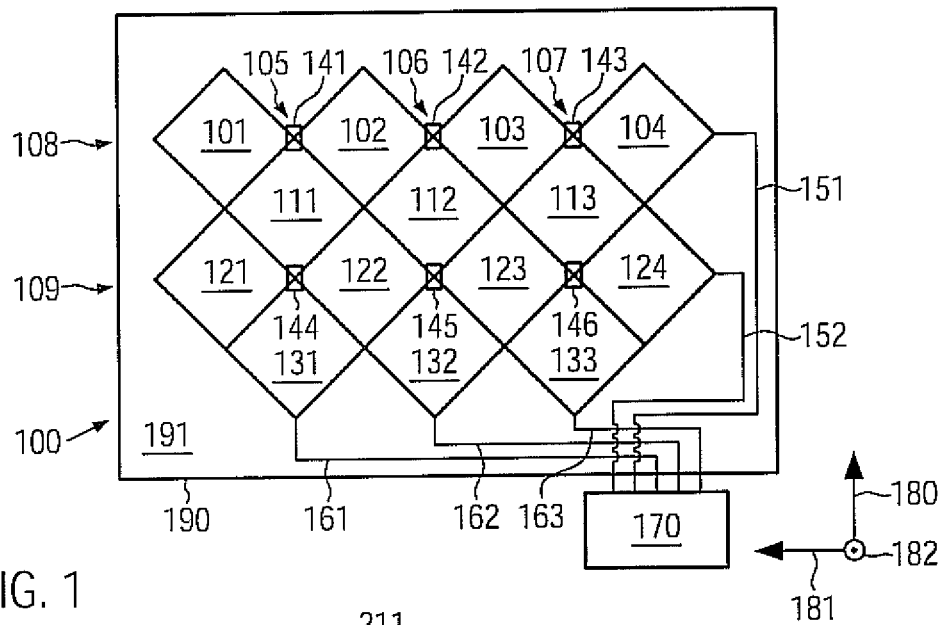
FIG. 1 shows a schematic top view of a touch sensor according to an embodiment of the present invention.

FIG. 1 shows a schematic top view of a touch sensor 100 according to an embodiment of the present invention. The touch sensor 100 comprises a substrate 190 that can be a transparent glass or plastic plate, or a film material, for example a polymer film. In some embodiments, the substrate 190 can be integral with a front panel of a screen or display, such as, for example, a liquid crystal display or a cathode ray tube. In other embodiments, the substrate 190 can be a separate substrate that can be mounted in front of a screen or display. The substrate 190 has a substrate surface 191.

The touch sensor 100 further comprises first electrode sets 105, 106, 107. The first electrode set 105 comprises electrodes 111, 131 that are formed over the substrate surface 191 and are arranged in a row along a first direction 180, which extends in the vertical direction in the top view of FIG. 1. Similarly, the first electrode set 106 comprises electrodes 112, 132 and the first electrode set 107 comprises electrodes 113, 133 which are arranged in respective rows along the first direction 180.

The touch sensor 100 further comprises second electrode sets 108, 109. The second electrode set 108 comprises electrodes 101, 102, 103, 104. The second electrode set 109 comprises electrodes 121, 122, 123, 124. The electrodes 101-104 of the second electrode set 108 are arranged in a row along a second direction 181. In the top view of FIG. 1, the second direction 181 extends in the horizontal direction. The electrodes 121-124 of the second electrode set 109 are also arranged in a row along the second direction 181.

The second direction 181 is perpendicular to the first direction 180. Moreover, the first direction 180 and the second direction 181 are perpendicular to a surface normal 182 of the substrate surface 191. In the top view of FIG. 1, the surface normal 182 is perpendicular to the plane of drawing of FIG. 1, and points towards the viewer. In the figures of the present applications, directions that are perpendicular to the plane of drawing and point towards the viewer are indicated by circles with a dot in the center, and directions perpendicular to the plane of drawing pointing away from the viewer are indicated by circles with an "x" in the center. Therefore, in FIG. 1, the surface normal 182 is shown as a circle with a dot in the center.

The electrodes 111, 131 of the first electrode set 105 are electrically connected to each other by a connection element formed in an electrode crossing portion 144. Similarly, the electrodes 112, 132 of the first electrode set 106 are connected to each other by a connection element formed in electrode crossing portion 145, and the electrodes 113, 133 of the first electrode set 107 are connected to each other by a connection element formed in electrode crossing portion 146.

The electrodes 101-104 of the second electrode set 108 are electrically connected to each other by connection elements formed in electrode crossing portions 141, 142, 143, and the electrodes 121-124 of the second electrode set 109 are electrically connected to each other by connection elements formed in electrode crossing portions 144-146.

Electrodes that belong to different electrode sets are electrically insulated from each other. For this purpose, gaps can be formed between adjacent electrodes belonging to different electrode sets. While, in FIG. 1, the gaps between the electrodes have been omitted for simplicity, in FIG. 2a, gaps between the electrodes 112, 122, 123, 132 are denoted by reference numerals 209, 210. Similar gaps can be formed between other electrodes. In particular, the first electrode sets 105, 106, 107 can be electrically insulated from the second electrode sets 108, 109.

The present invention is not limited to embodiments comprising three first electrode sets 105, 106, 107 and two second electrode sets 108, 109. In other embodiments, a greater or smaller number of first and second electrode sets can be provided. In some embodiments, the touch sensor 100 can comprise 12 first electrode sets comprising electrodes arranged in a row along the first direction 180 and 9 second electrode sets comprising electrodes arranged in a row along the second direction 181.

The touch screen 100 can further comprise a controller 170. Electrically conductive lines 161, 162, 163 electrically connect the control circuit 170 to the first electrode sets 105, 106, 107 and electrically conductive lines 151, 152 electrically connected control circuit 170 to the second electrode set 108, 109.

The electrodes 101-104, 112-113, 121-124 and 131-133 of the touch sensor 100 can be formed of a first material. The first material can be an electrically conductive and light transmissive material. In some embodiments, the first material can comprise indium tin oxide (ITO), fluoride doped tin oxide (FTO), aluminum doped zinc oxide (AZO), antimony doped tin oxide (ATO), or a transparent organic conductive film such as polyethylenedioxythiopheme (PEDOT). A thickness of the first material in the electrodes 101-104, 111-113, 121-124, 131-133 can be adapted such that the electrodes 101-104, 111-113, 121-124, 131-133 are transparent. Thus, a screen provided behind the touch sensor 100 can be seen through the touch sensor 100.

The electrically conductive lines 151, 152, 161, 162, 163 can comprise a second material having a lower specific electric resistance than the first material. In particular, the electrically conductive lines 151, 152, 161, 162, 163 can comprise a metal such as copper, silver and/or gold. In some embodiments, the electrically conductive lines 151, 152, 161, 162, 163 can comprise printed nano-silver.

The electrically conductive lines 151, 152, 161, 162, 163 can be formed on a peripheral portion of the substrate surface 191 that is located outside a center portion of a screen wherein an image is displayed when the touch sensor 100 is provided in front of the screen. In such embodiments, the electrically conductive lines 151, 152, 161, 162, 163 need not be transparent and can be formed from an opaque material.

In the operation of the touch sensor 100, the control circuit 170 can apply an electric voltage between at least one of the first electrode sets 105, 106, 107 and at least one of the second electrode sets 108, 109. Thus, an electric field is obtained between the at least one of the first electrode sets 105, 106, 107 and the at least one of the second electrode sets 108, 109. Since the electrodes 111-113, 131-133 of the first electrode sets 105, 106, 107 and the electrodes 101-104 and 121-124 of the second electrode sets 10B, 109 are arranged adjacent each other, at least a portion of the electric field extends into a region above the touch sensor 100. If an electrically conductive object such as the finger of a user or a stylus comprising an electrically conductive material is brought into the region above the touch sensor 100, the electric field interacts with the conductive object. This leads to a change of the capacitance between one of the first electrode sets 105, 106, 107 and one of the second electrode sets 108, 109 that are in the vicinity of the electrically conductive object.

In some embodiments, the touch sensor 100 can be used in a multi-touch enabled touch screen or touch panel. If a plurality of electrically conductive objects, for example a plurality of fingers of a user, are brought into the region above the touch sensor 100 into which the electric fields between the first electrode sets 105, 106, 107 and the second electrode sets 10B, 109 extend, the electric conductivity between a plurality of pairs of first electrode sets 105, 106, 107 and second electrode sets 108, 109 changes. By an appropriate analysis of the change of capacitances between pairs of first electrode sets 105, 106, 107 and second electrode sets 108, 109, the position of more than one electrically conductive object in the vicinity of the touch sensor 100 can be determined.

The control circuit 170 can be adapted for detecting capacitance changes between pairs of the first electrode sets 105, 106, 107 and second electrode sets 108, 109 caused by the presence of one or more electrically conductive objects in the vicinity of the touch sensor 100. In some embodiments, the control circuit can monitor the capacitance between each pair of electrode sets comprising one of the first electrode sets 105, 106, 107 and one of the second electrode sets 108, 109. Since the first electrode sets 105, 106, 107 and the second electrode sets 108, 109 extend along the first direction 180 and second direction 181, respectively, which are orthogonal to each other, this allows a two dimensional detection of the position of one or more electrically conductive objects.

The control circuit 170 can comprise an impedance change detection engine for detecting the change of the capacitance between pairs of electrode sets comprising one of the first electrode sets 105, 106, 107 and one of the second electrode sets 108, 109. For this purpose, a sense clock signal can be applied to an RC network comprising the capacitance between one of the first electrode sets 105, 106, 107 and one of the second electrode sets 108, 109, and a resistor. The resistor can comprise an electrical resistance of the electrode sets and/or a separate resistor provided in the control circuit. A delay between the sense clock signal and an output signal of the RC network is representative of the capacitance between the respective first electrode set 105, 106, 107 and the respective second electrode set 108, 109. Hence, a change of the capacitance between one of the first electrode sets 105, 106, 107 and one of the second electrode sets 108, 109 leads to a change of the delay between the sense clock signal and the output signal of the respective RC network. The impedance change detection circuit can be adapted for detecting this change of the delay.

In some embodiments, the control circuit 170 can comprise a calibration unit comprising a reference capacitor and a reference resistor. A sense clock signal similar to the sense clock signal applied between the first electrode sets 105, 106, 107 and the second electrode sets 108, 109 can be applied to an RC network formed by the reference capacitor and the reference resistor, and the delay of an output of the reference circuit relative to the sense clock signal can be determined. The control circuit 170 can be configured to determine the difference between the delay obtained from the reference circuit and the delay obtained from the RC networks comprising pairs of first electrode sets 105, 106, 107 and second electrode sets 108, 109 for calibrating the delay associated with the respective pair of electrode sets. The calibration can be performed in the absence of the user's fingers or a stylus in the vicinity of the touch sensor. The difference between the delays can be quantified as a calibrated impedance and recorded in impedance registers, wherein an impedance register can be associated with each pair of electrode sets.

If a finger or another electrically conductive object such as a stylus is provided in the vicinity of the touch sensor, the capacitance change caused thereby leads to a change of the RC delay time of at least one of the RC networks. A comparison between the currently measured impedance and the calibrated impedance stored in the respective impedance register can be used to determine a touch condition of the touch sensor 100. In some embodiments, known ratiometric techniques can be used to improve a precision of the determination of the position of one or more fingers or other electrically conductive objects provided in the vicinity of the touch sensor 100.

The control circuit 170 can further be adapted for the interpretation of data relating to measured capacitances between electrode sets and/or for data filtering.

Figure 2A:
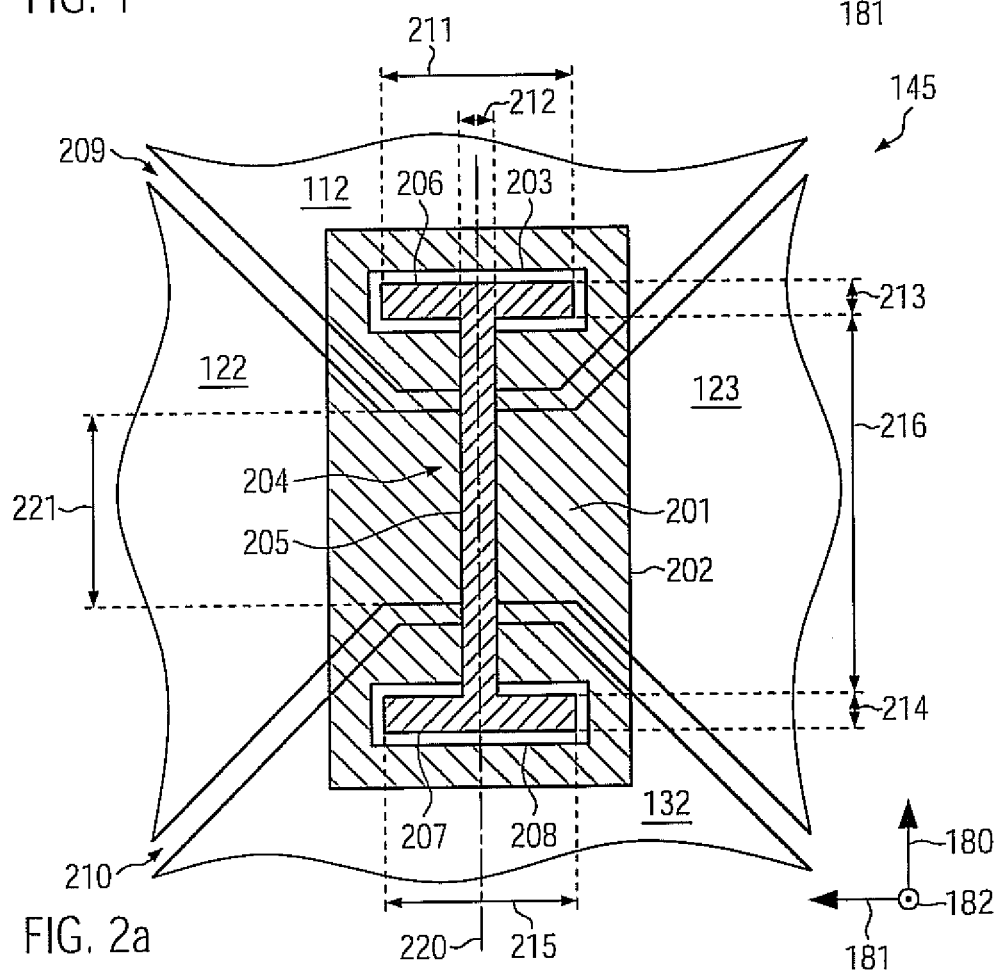
FIG. 2a shows a schematic top view of an electrode crossing portion in a touch sensor according to an embodiment of the present invention.
Figure 2B:
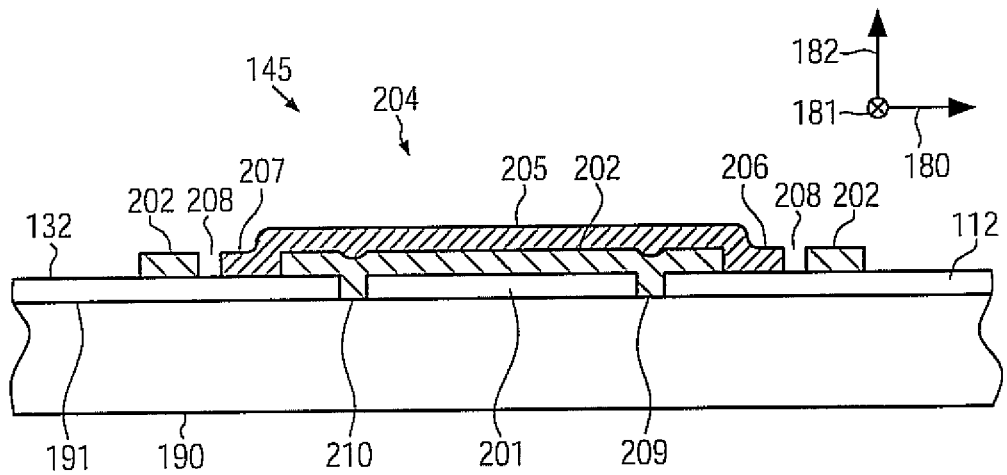

To provide the above described functionality, the control circuit can comprise appropriately adapted circuitry. FIGS. 2a and 2b show enlarged detail views of the electrode crossing portion 145 located between the electrodes 112, 122, 123 and 132 according to embodiments of the present invention. The configuration of other electrode crossing portions 141-144, 146 in the touch sensor can correspond to that of the electrode crossing portion 145.

FIG. 2a is a top view wherein the orientation of the first direction 180, the second direction 181 and the surface normal 182 is the same as in FIG. 1. FIG. 2b shows a cross sectional view of the electrode crossing portion 145 along the dashed line 220 shown in FIG. 2a. In FIG. 2b the first direction 180 is from left to right, and the surface normal 182 is in the vertical direction. The second direction 181 points in a direction away from the viewer.

A connection element 204 is provided in the electrode crossing portion 145. The connection element 204 provides an electrical connection between adjacent electrodes 112, 132 which are part of the first set of electrodes 106. The connection element 204 comprises a first portion 206 that contacts the electrode 112, a second portion 207 that contacts the electrode 132 and a third portion 205 providing an electrical connection between the first portion 206 and the second portion 207. The connection element 204 can be formed of a second material having a smaller specific electric resistance than the first material from which the electrodes of the touch sensor 100 are formed. In particular, the connection element 204 can be formed of a metal, for example copper, silver and/or gold. In some embodiments, the connection element 204 can comprise printed nano-silver.

The electrode crossing portion 145 further comprises a connection element 201 providing an electrical connection between the electrodes 122, 123 which are part of the second electrode set 109. The connection element 201 can be formed from the first material, such that the connection element 201 is formed from the same material as the electrodes 122, 123, and the connection element 201 can be integral with the electrodes 122, 123.

An electrically insulating element 202 is formed between the connection element 201 and the connection element 204 and provides an electrical insulation between the connection elements 201, 205. Thus, there is substantially no ohmic electrical connection between the first electrode set 106 and the second electrode set 109. The electrically insulating element 202 can be formed from an electrically insulating material such as, for example, silicone dioxide, polymethyl methacrylate (PMMA), benzocyclobutene (BOB) and/or polyvinyl.

The electrically insulating element 202 can comprise openings 203, 208. The first portion 206 of the connection element 204 can contact a portion of the electrode 112 exposed in the opening 203, and the second portion 207 of the connection element 204 can contact a portion of the electrode 132 exposed in the opening 208. The third portion 205 of the connection element 204, or at least a portion thereof, can be separated from the connection element 201, from a portion of the substrate surface 191 in the gaps 209, 210 between the electrodes 112, 122, 123, 132 and from portions of the electrodes 112, 132 in the vicinity of the edges of the electrodes 112, 132 adjacent the connection element 201 by the insulating layer 202.

As shown in FIG. 2b, the electrodes of the touch sensor 100 (in particular, electrodes 112, 122, 123, 132) and the connection element 201 can be formed on the substrate surface 191. The electrically insulating element 202 can be formed over the electrodes 112, 122, 123, 132, and the connection element 204, can be formed over the electrically insulating element 202.

For this purpose, a layer of the first material can be deposited on the substrate surface 191 by deposition techniques such as, for example, chemical vapour deposition and/or plasma enhanced chemical vapour deposition.

Thereafter, patterning techniques such as, for example, photolithography and etching can be employed for selectively removing portions of the layer of first material from portions of the substrate surface 191 other than those on which the electrodes of the touch sensor 100 and the connection element 201 are to be formed. In particular, portions of the layer of first material at the locations of the gaps 209, 210 between the electrodes 112, 122, 123, 132 and portions of the layer of first material in the vicinity of the edges of the substrate 190 can be removed.

Thereafter, a layer of insulating material can be formed over the substrate 190, and the layer of insulating material can be patterned by techniques including photolithography and etching for forming the electrically insulating element 202 and similar electrically insulating elements in other electrode crossing portions 141-144, 146 of the touch sensor 100.

Thereafter, a layer of the second material can be formed over the substrate 190, and the layer of second material can be patterned to form the connection element 204 and similar connection elements in electrode crossing portions 141-144, 146 other than the electrode crossing portion 145. Alternatively, printing techniques can be used for forming the connection element 204 and similar connection elements.

The present invention is not limited to embodiments wherein the insulating element 202 is formed over the electrodes 112, 132 and the connection element 201, and the connection element 204 is formed over the insulating element 202. In other embodiments, the connection element 204 can be formed on the substrate surface 191, the insulating element 202 can be formed over the connection element 204, and the electrodes of the touch sensor 100, as well as the connection element 201 can be formed over the insulating element 202. In the formation of touch sensors according to such embodiments, the above-described steps for forming the touch sensor 100 can be performed in a different order.

The relative arrangement of the connection element 204 and the electrodes 112, 132 connected by the connection element 204 will be described in more detail in terms of a projection of the connection element 204 and the electrodes 112, 132 on the substrate surface 191. A projection of a point of the connection element 204 or one of the electrodes 112, 131 on the substrate surface 191 can be obtained as an intersection between the substrate surface 191 and a line that is parallel to the surface normal 182 and runs through the respective point. The projection of the connection element 204 on the substrate surface 191 can be obtained by projecting each of the points of the connection element 204 on the substrate surface 191, and the projection of the electrodes 112, 132 on the substrate surface 191 can be obtained by projecting each of the points of the electrodes 112, 132 on the substrate surface 191.

The projections of the connection element 204 and the electrodes 112, 132 on the substrate surface 191 are not material objects, but are used for describing the relative arrangement of the connection element 204 and the electrodes 112, 132 in a manner that is independent of the sequence in which the electrodes 112, 132, the insulating element 202 and the connection element 204 are formed over the substrate surface 191. In particular, the projections of the electrodes 112, 132 and the connection element 204 on the substrate surface 191 are substantially independent on whether the connection element 204 and the insulating element 202 are formed over the electrodes 112, 132, as shown in FIG. 2b, or whether the connection element 204 and the insulating element 202 are formed below the electrodes 112, 132.

Since the direction of view of FIG. 2a is parallel to the surface normal 182, the projections of the connection element 204 and the electrodes 112, 132 on the substrate surface 191 have two-dimensional shapes corresponding to the shapes shown in the top view of FIG. 2a.

The projection of the first portion 206 of the connection element 204 on the substrate surface 191 can be within a projection of the electrode 112 on the substrate surface 191. Hence, as can be seen in the top view of FIG. 2a, there is a portion of the electrode 112 around the first portion 206 of the connection element 204. Similarly, the projection of the second portion 207 of the connection element 204 on the substrate surface 191 along the surface normal 182 is within the projection of the electrode 132 on the substrate surface 191 along the surface normal 182. Thus, in a top view of the touch sensor, there is a portion of the electrode 132 around the second portion 207 of the connection element 204. This arrangement can allow providing a desired area of the electrical contact between the portions 206, 207 of the connection element 204 and the electrodes 112, 132 even in the presence of alignment errors between the connection element 204 and the electrodes 112, 132.

The first portion 206, the second portion 207 and the third portion 205 of the connection element 204 each can have a rectangular shape. A dimension 212 of the third portion 205 in the second direction 181 can be smaller than a dimension 211 of the first portion 206 in the second direction 181 and a dimension 215 of the second portion 207 in the second direction 181. In some embodiments, the dimensions 211, 215 of the first portion 206 and the second portion 207 in the second direction 181 can be approximately equal, and can, in some embodiment, have a value of in a range from approximately 15 μm to approximately 60 μm. The dimension 212 of the third portion 205 in the second direction can, in some embodiments, have a value of in a range from approximately 5 μm to approximately 15 μm.

A dimension 216 of the first portion 205 of the connection element 204 in the first direction 180 can be greater than a dimension 213 of the first portion 206 in the first direction 180 and a dimension 214 of the second portion 207 in the first direction 180. Thus, the connection element 204 obtains an H-shape. In some embodiments, the dimension 216 of the third portion in the first direction 180 can have a value in a range from approximately 100 μm to approximately 700 μm. The dimensions 213, 214 of the first 206 and second 207 portion can be approximately equal and can, in some embodiments, have a value in a range from approximately 5 μm to approximately −15 μm.

The electrodes 101-104, 111-113, 121-124 and 131-133 of the touch sensor 100 can have an approximate rhombus shape, wherein the diagonals of the rhombus extend along the first direction 180 and the second direction 181, as shown in FIG. 1.

In such embodiments, the first portion 206 and the second portion 207 of the connection element 204 extend across the rhombus shaped electrodes 112, 132 in the vicinity of the narrow portions of the rhombi adjacent the connection element 201. This arrangement can allow reducing the electric resistance of the respective first electrode set 106 comprising the electrodes 112, 132, as will be explained in more detail in the following.

Figure 5:
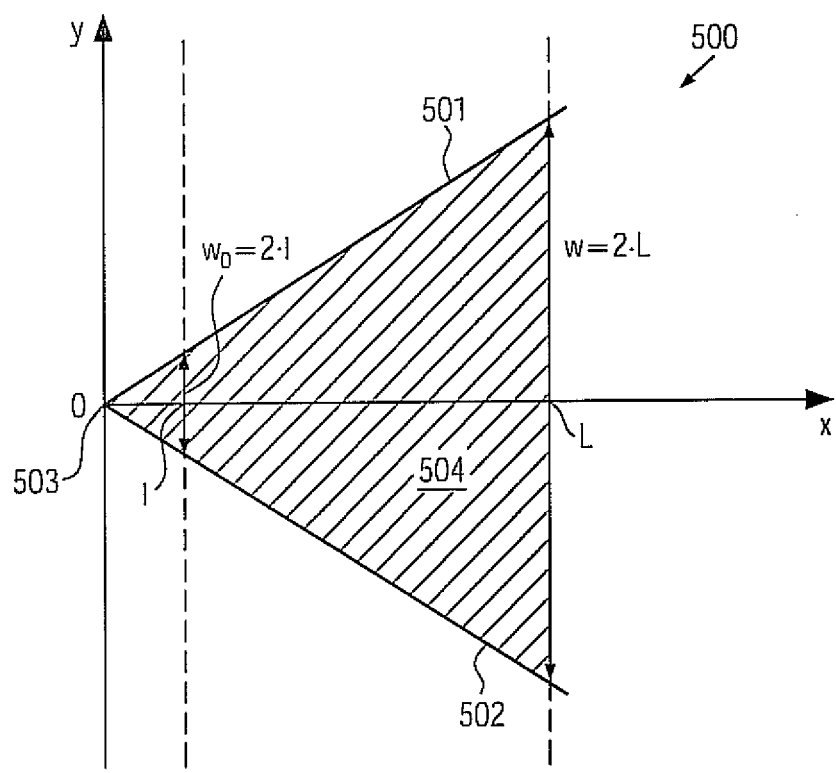
FIG. 5 shows a diagram illustrating calculations of electrical resistivities of portions of rhomboidal electrodes.

FIG. 5 schematically depicts a portion 504 of a rhombus-shaped electrode in the vicinity of a corner 503 of the rhombus. The corner 503 is located at the origin of a coordinate system 500 having an x-axis and a y-axis. For the electrode 112, the direction of the x-axis can correspond to the first direction 180, and the direction of the y-axis can correspond to the second direction 181. Edges of the rhombus adjacent the corner 503 (corresponding to edges of the electrode 112 adjacent the gap 209) are given by a straight line 501 defined by the equation y=x and a straight line 502 defined by the equation y=−x.

For an electrical current flowing in the x-direction, the electrical resistivity of a portion of the rhombus from x=1 to x=L is, according to Ohm's law, $$R = \rho \cdot T \cdot \int_{l}^{L} \frac{dx}{2x} = \frac{\rho \cdot T}{2} \cdot \ln\left(\frac{L}{l}\right) = \frac{\rho \cdot T}{2} \ln\left(\frac{w}{w_n}\right)$$

Wherein ρ is the specific electrical resistance of the material from which the rhombus shaped electrode is formed, T is the thickness of the material, w is the width of the rhombus at position x=L and $w_o$ is the width of the rhombus at position x=1.

Hence, if a rhombus shaped electrode is contacted by means of a portion of a connection element extending across a portion of the electrode having a width $w_o$, the electrical resistance experienced by the current decreases, the greater $w_o$ is.

Thus, the electrical resistance of a current flowing from the electrode 112 to the electrode 132 via the connection element 204 can be reduced by providing the connection element 204 with the first portion 206 and the second portion 207 extending across the electrodes 112, 132, compared to touch sensors wherein a point like contact between the connection element 204 and the electrodes 112, 132 is provided.

Moreover, since the first portion 206 and the second portion 207 of the connection element 204 extend over a greater area of the electrodes 112, 132 than contact areas of a connection element providing a point like contact, fluctuations of the electrical resistance between connection elements in different electrode crossing portions of the touch sensor 100 can be reduced.

In some embodiments, the dimension 213 of the first portion 206 of the connection element 204 in the first direction 280, the dimension 214 of the second portion 207 of the connection element 204 in the first direction 280 and the dimension 212 of the third portion 205 of the connection element 204 in the second direction 281 can be less than or equal to fifteen micrometers. Thus, the H-shaped connection element 204 is constructed of electrically conductive line portions having a width less than or equal to fifteen micrometers, which are substantially invisible to the human eye. Thus, even in embodiments wherein the connection element 204 is formed from an opaque material such as, for example, a metal, a visibility of the connection element 204, which might adversely affect the optical appearance of the touch sensor 100, can be avoided.

The connection element 201 providing an electrical connection between the electrodes 122, 123 of the second electrode set 109 that can, in some embodiments, be formed from the first material that has a greater specific electrical resistance than the second material from which the connection element 204 is formed, has a dimension 221 in the first direction 180. The dimension 221 can be greater than the dimension 212 of the third portion 205 of the connection element 204 in the second direction. Thus, a relatively large cross-sectional area of the connection element 201 can be obtained. This can help to obtain a relatively low resistivity of the connection element 201, although the connection element 201 is formed from a material having a relatively large specific electrical resistance.

Figure 3:
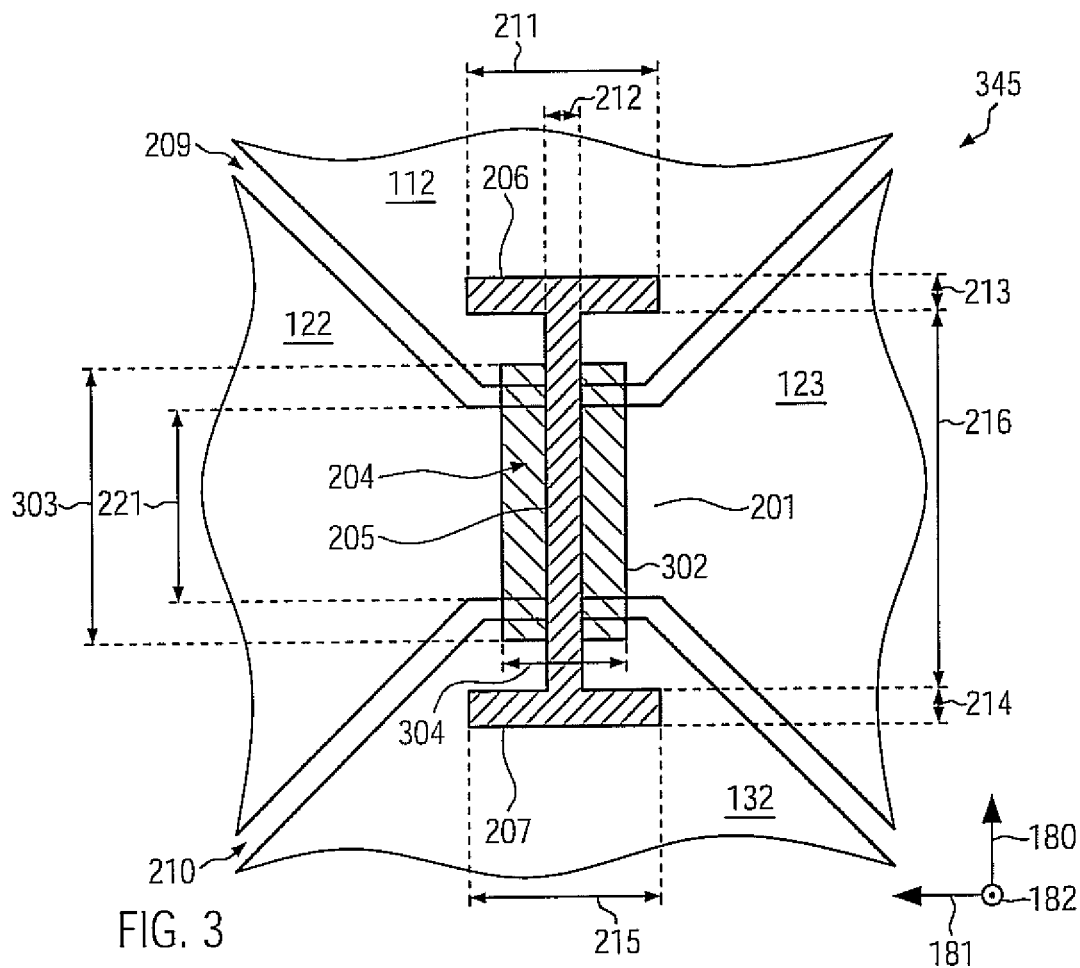
FIG. 3 shows an electrode crossing portion in a touch sensor according to another embodiment of the present invention.

FIG. 3 shows a schematic top view of an electrode crossing portion 345 in a touch sensor according to another embodiment. The electrode crossing portion 345 can be used in the touch sensor 100 described above with reference to FIG. 1 instead of electrode crossing portions 141-146 having a structure as described above with reference to FIGS. 2a and 2b.

For convenience, in FIG. 3 and in FIGS. 1, 2a and 2b like reference numerals have been used to denote like components. Components shown in FIG. 3 denoted by the same reference numerals as components shown in FIGS. 1, 2a and 2b can have the same features as described above with reference to FIGS. 1, 2a and 2b, and a detailed description thereof will be omitted.

The electrode crossing portion 345 comprises a connection element 204 providing an electrical connection between electrodes 112, 132 of a first electrode set 106, and a connection element 201 providing an electrical connection between electrodes 122, 123 of second electrode set 109. Features of the connection elements 201, 204 can be as described above with reference to FIGS. 2a and 2b.

The electrode crossing portion 345 comprises an electrically insulating element 302 separating the third portion 205 of the connection element 204 from the connection element 201. Similar to the electrically insulating element 202 described above with reference to FIGS. 2a and 2b, the electrically insulating element 302 can be formed from a transparent electrically insulating material such as, for example, silicon dioxide.

Different from the electrically insulating element 202, the electrically insulating element 302 does not comprise openings wherein the first portion 206 and the second portion 207 of the connection element 204 are formed. Instead, a dimension 303 of the electrically insulating element 302 in the first direction 180 is smaller than the dimension 216 of the third portion 205 of the connection element 204 in the first direction 180, and the first portion 206 and the second portion 207 of the connection element 204 are formed adjacent the electrically insulating element 302. In some embodiments, a dimension 304 of the electrically insulating element 302 in the second direction 181 can be smaller than the dimensions 211, 215 of the first portion 206 and the second portion 207 of the connection element 204 in the second direction 181, while being greater than the dimension 212 of the third portion 205 of the connection element 204 in the second direction 181.

Hence, by providing the touch sensor 100 with electrode crossing portions having a structure corresponding to that of the electrode crossing portion 345, the area covered by the electrically insulating elements 302 separating the third portion 205 of the connection element 204 from the connection element 201 can be reduced which can help improving the overall transparency of the touch-screen.

Figure 4A:
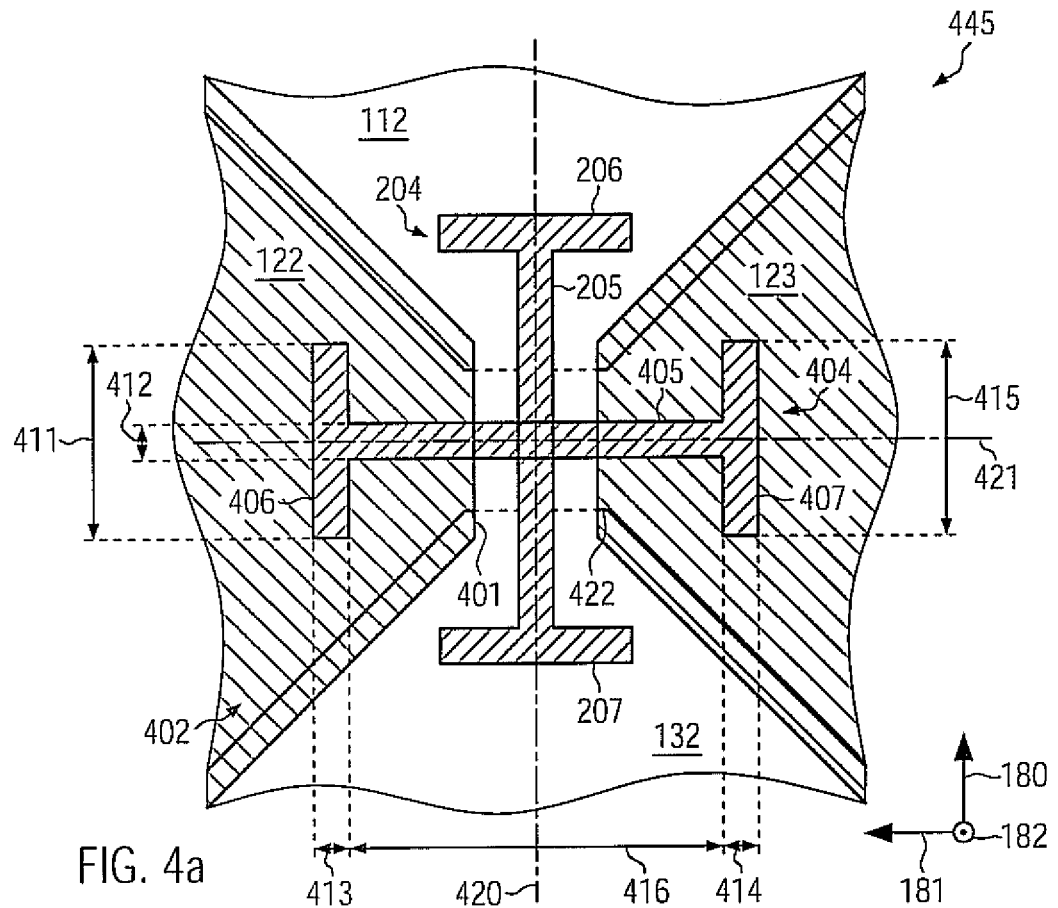
FIG. 4a shows a schematic top view of an electrode crossing portion in a touch sensor according to a further embodiment of the present invention.
Figure 4B:
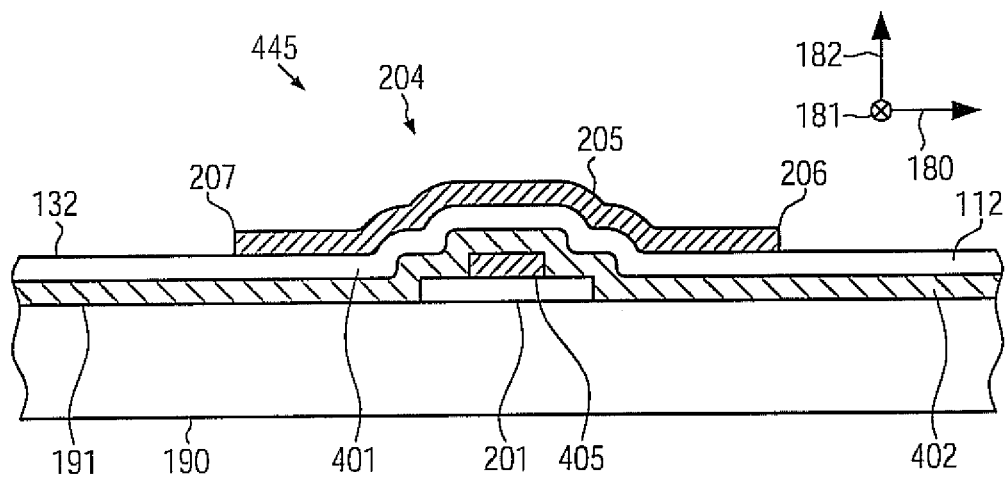
Figure 4C:
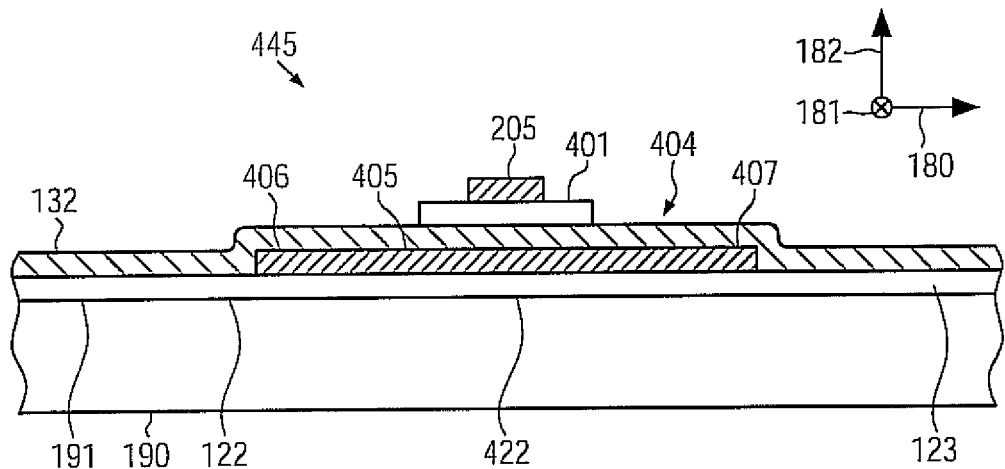

FIG. 4a shows a schematic top view of an electrode crossing portion 445 for a touch sensor according to yet another embodiment of the present invention. FIG. 4b shows a schematic cross section of the electrode crossing portion 445 along a line 420 extending along the first direction 180, and FIG. 4c shows a schematic cross section of the electrode crossing portion 445 along a line 421 extending along the second direction 181.

For convenience, in FIGS. 4a, b and c, and in FIGS. 1 to 3, like reference numerals have been used to denote like components, and components of the electrode crossing portion 445 can have features corresponding to those of components denoted by like reference numerals in FIGS. 1 to 3.

The electrode crossing portion 445 can be employed in a touch sensor similar to the touch sensor 100 described above, wherein the electrodes 111-113, 131-133 of the first electrode sets 105, 106, 107 arranged along the first direction 180 are formed on a different surface than the electrodes 101-104, 121-124 of the second electrode sets 108, 109 extending along the second direction 181. As shown in FIG. 4b and FIG. 4c, the electrodes 112 and 132 and other electrodes of the first electrode sets 105, 106, 107 can, in some embodiments, be formed on the surface of an electrically insulating transparent layer 402, whereas the electrodes 122, 123, as well as the other electrodes of the second electrode sets 108, 109 can be formed on the substrate surface 191. The layer 402 separates the surface on which the electrodes of the first electrode sets 105, 106, 107 and the surface on which the electrodes of the second electrode sets 108, 109 are formed from each other. The layer 402 can be formed from an electrically insulating transparent material such as, for example, silicon dioxide, glass, polyethylene terephtalate (PET), and/or polyethylene naphthalate (PEN).

The present invention is not limited to embodiments wherein the electrodes 111-113, 131-133 of the first electrode sets 105, 106, 107 are formed on the surface of the insulating layer 402 and the electrodes 101-104, 121-124 of the second electrode sets 108, 109 are formed on the substrate surface 191. In other embodiments, the electrodes 111-113, 131-133 of the first electrode sets 105, 106, 107 can be formed on the substrate surface 191, and the electrodes 101-104, 121-124 of the second electrode sets 108, 109 can be formed on the surface of the electrically insulating layer 402.

Both in embodiments wherein the electrodes 111-113, 131-133 of the first electrode sets 105, 106, 107 are formed on the surface of the electrically insulating layer 402 and the electrodes of the second electrode sets 108, 109 are formed on the substrate surface 191, and in embodiments wherein the electrodes 111-113, 131-133 of the first electrode sets 105, 106, 107 are formed on the substrate surface 191 and the electrodes 101-104, 121-124 of the second electrode sets 108, 109 are formed on the surface of the electrically insulating layer 402, the electrically insulating layer 402 is formed between the surface on which the electrodes of the first electrode sets are formed and the surface on which the electrodes of the second electrode sets are formed.

In still further embodiments, the electrodes 111-113, 131-133 of the first electrode sets 105, 106, 107 can be formed on a first surface of the substrate 190, for example on the substrate surface 191, and the electrodes 101-104, 121-124 of the second electrode sets 108, 109 can be formed on a second surface on a side of the substrate 190 opposite the side on which the electrodes 111-113, 131-133 of the first electrode sets 105, 106, 107 are formed. In such embodiments, an electrically insulating layer separating the surface on which the electrodes 111-113, 131-133 of the first electrode sets 105, 106, 107 are formed and the surface on which the electrodes 101-104, 121-124 of the second electrode sets 108, 109 are formed is provided in form of the electrically insulating substrate 190.

Similar to the electrode crossing portions 145, 345 described above, the electrode crossing portion 445 comprises a connection element 204 providing an electrical connection between the electrodes, 112, 132 of the first electrode set 106. Features of the connection element 204 can be as described above with reference to FIGS. 1 to 3.

In addition to being electrically connected by the connection element 204, the electrodes 112, 132 can be electrically connected by means of an electrode connector portion 401. The electrode connector portion 401 can be formed of a light transmissive electrically conductive material. In some embodiments, the electrode connector portion 401 can be formed from the first material, from which the electrodes of the touch sensor are formed, and can be integral with the electrodes 112, 132 of the first electrode set 106. Thus, the electrodes 112, 132 of the first electrode set 106 are double routed. This can help to further reduce the electrical resistivity of the connection between the electrodes 112, 132.

The electrode crossing portion 445 further comprises a connection element 404 providing an electrical connection between the electrodes 122, 123 of the second electrode set 109. The connection element 409 can be formed from a second material having a smaller specific electrical resistance than the first material from which the electrodes of the touch sensor are formed, for example from a metal such as copper, silver and/or gold. In some embodiments, the connection element 404 can be formed from printed nano-silver.

The connection element 404 comprises a first portion 406 electrically connected to the electrode 122, a second portion 407 electrically connected to the electrode 123, and a third portion 405 providing an electrical connection between the first portion 406 and the second portion 407. In addition to the connection element 404, the electrode crossing portion 445 can comprise an electrode connector portion 422 formed from an electrically conductive and light transmissive material, for example the first material, that also provides an electrical connection between the electrodes 122, 123 of the second electrode set 109. Thus, the electrodes of the second electrode sets are double routed. This can help to further reduce the electrical resistivity of the connection between the electrodes of the second electrode sets.

As shown in FIGS. 4b and 4c, the connection element 204 can be formed on the electrodes 112, 132 and the electrode connector portion 401, and the connection element 405 can be formed on the electrodes 122, 123 and the electrode connector portion 422. In other embodiments, the connection element 204 can be formed under the electrodes 112, 132 and the electrode connector portion 401, and the connection element 405 can be formed under the electrodes 122, 123 and the electrode connector portion 422.

For forming a touch sensor 100 comprising electrode connector portions having a structure corresponding to that of the electrode connector portion 445, a first layer of the first material can be formed on the substrate surface 191. Thereafter, the first layer of the first material can be patterned by means of known processes, for example by means of photolithography and etching, to form the electrodes 101-104, 121-124 of the second electrode sets 108, 109 as well as the electrode connector portion 422 and other, similar electrode connector portions between electrodes of the second electrode sets 108, 109.

Thereafter, the connection element 404 can be formed, for example by depositing a layer of the second material and patterning the layer of second material by means of photolithography and etching, or by means of printing techniques.

Subsequently, the layer 402 can be deposited. On the layer 402, a second layer of the first material can be formed, and the electrodes 111-113, 131-133 of the first electrode sets 105, 106, 107, as well as the electrode connector portion 401 and other, similar electrode connector portions connecting electrodes of the first electrode sets 105, 106, 107 can be formed by patterning the second layer of the first material.

Then, the connection element 204 and other, similar connection elements connecting electrodes 111-113, 131-133 of the first electrode sets 105, 106, 107 can be formed by depositing a layer of the second material and patterning the layer of the second material, or by means of printing techniques In embodiments wherein the arrangement of the components of the touch sensor is different from the one shown in FIGS. 4b and 4c, the above mentioned steps can be performed in a different order.

The first portion 206 of the connection element 204 can be formed above or below the electrode 112, such that a projection of the first portion 206 onto the substrate surface 191 along the surface normal 182 is within a projection of the electrode 112 onto the substrate surface 191 along the surface normal 182. The second portion 207 of the connection element 204 can be formed above or below the electrode 132, such that a projection of the second portion 207 onto the substrate surface 191 along the surface normal 182 is within a projection of the electrode 132 onto the substrate surface 191 along the surface normal 182.

The connection element 404 can have a shape similar to that of the connection element 204, wherein an orientation of the connection element 404 is rotated by an angle of approximately 90 degrees relative to the orientation of the connection element 204. The first portion 406 of the connection element 404 can be formed above or below the electrode 122, such that a projection of the first portion 406 onto the substrate surface 191 along the surface normal 182 is within a projection of the electrode 122 onto the substrate surface 191 along the surface normal 182. The second portion 407 of the connection element 404 can be formed above or below the electrode 123, such that a projection of the second portion 407 onto the substrate surface 191 along the surface normal 182 is within a projection of the electrode 123 on the substrate surface 191 along the surface normal 182.

A dimension 412 of the third portion 405 of the connection element 404 in the first direction 180 can be smaller than a dimension 411 of the first portion 406 in the first direction and a dimension 415 of the second portion 407 in the first direction 180. In some embodiments, the dimensions 411, 415 can be approximately equal. Moreover, a dimension 416 of the third portion 405 in the second direction 181 can be greater than a dimension 413 of the first portion 406 in the second direction 181 and a dimension 414 of the second portion 407 in the second direction 181. In some embodiments, the dimensions 413, 414 can be approximately equal. Values of the dimensions 411, 412, 413, 414, 415, 416 of the portions of the connection element 404 can correspond to the dimensions of corresponding portions of the connection element 204.

In some embodiments, each of the first 406, second 407 and third 405 portion of the connection element 404 can have a rectangular shape, such that the connection element 404 obtains an H-shape. This shape can help to provide a small electrical resistivity of the electrical connection between the electrodes 122, 123, and can help to reduce fluctuations of the electrical resistivity of connections between different electrodes of the second sets of electrodes of the touch sensor.

In some embodiments, the dimension 412 of the third portion 405 of the connection element 404 in the first direction 180, and the dimensions 413, 414 of the first 406 and second 407 portion of the connection element 404 in the first direction 181 can be equal to or less than 15 micrometers. This can help to reduce a visibility of the connection element 404.

The present invention is not limited to embodiments wherein the first 206 and second 207 portion of the connection element 204 and the first 406 and second 407 portion of the connection element 404 have a substantially rectangular shape. In other embodiments, the first 206, 406 and second 207, 407 portions of the connection elements 204, 404 can have a different shape. For example, curved first 206, 406 and second 207, 407 portions of the connection elements 204, 404 can be employed. In further embodiments, isosceles trapezoid shapes can be employed for the first 206, 406 and the second 207, 407 portions of the connection elements 204, 404 The parallel sides of the first 206 and second 207 portions of the connection element 204, when having an isosceles trapezoid shape, can be oriented in the second direction 181, with the smaller of the parallel sides being common to the third portion 205. The parallel sides of the first 406 and second 407 portions of the connection element 404, when having an isosceles shape, can be oriented in the first direction 208, with the smaller of the parallel sides being common to the third portion 405.

In all embodiments described above, a cover layer formed of a transparent electrically insulating material (not shown in the Figures) can be formed above the touch sensor 100 for protecting the touch sensor 100, and for avoiding an ohmic electrical connection between an object in the vicinity of the touch sensor 100 such as, for example, a user's finger or a stylus and the electrodes of the touch sensor.

That which is claimed:

1. A touch sensor comprising:
   a substrate having a substrate surface; and
   at least one first electrode set comprising
      a plurality of electrodes over the substrate surface and arranged in a row along a first direction, said electrodes comprising first material being electrically conductive and light transmissive, and
      at least one connection element coupling a pair of adjacent ones of the plurality of electrodes, said at least one connection element comprising a second material having a lower specific electrical resistance than the first material,
      said at least one connection element comprising a first portion, a second portion, and a third portion, the third portion coupling the first portion and the second portion,
      the first portion having a projection onto the substrate surface along a surface normal to the substrate surface being within a projection of a first one of the pair of electrodes coupled by the at least one connection element onto the substrate surface along the surface normal,
      the second portion having a projection onto the substrate surface along the surface normal being within a projection of a second one of the pair of electrodes coupled by the connection element onto the substrate surface along the surface normal,
      a dimension of the third portion in a second direction perpendicular to the first direction and the surface normal being smaller than a dimension of the first portion in the second direction and a dimension of the second portion in the second direction,
      with each of the first, second, and third portions having a rectangular shape, wherein a longer side of the first portion and a longer side of the second portion extend in the second direction, and wherein a longer side of the third portion extends in the first direction.

2. A touch sensor as in claim 1, wherein a dimension of the third portion in the first direction is greater than a dimension of the first portion in the first direction and a dimension of the second portion in the first direction.

3. A touch sensor as in claim 1, wherein at least one of a dimension of the first portion in the first direction, a dimension of the second portion in the first direction, and a dimension of the third portion in the second direction are less than or equal to 15 μm.

4. A touch sensor as in claim 1, wherein each of the electrodes of the at least one first set thereof has a rhombus shape, a first diagonal of the rhombus extending in the first direction, a second diagonal of the rhombus extending in the second direction.

5. A touch sensor as in claim 1, further comprising at least one second electrode set comprising a plurality of electrodes arranged in a row along the second direction, and being transparent and formed from the first material, and at least one connection element coupling a pair of adjacent ones of the plurality of electrodes.

6. A touch sensor as in claim 5, wherein portions of the electrodes of the at least one second electrode set are formed on a same surface as portions of the electrodes of the at least one first electrode set, and each of the third portions of the connection elements of the at least one first electrode set is at least partially located above or below one of the connection elements of the at least one second electrode set and separated therefrom by an insulating layer.

7. A touch sensor as in claim 6, wherein the at least one connection element of the at least one second electrode set are formed from the first material, and a dimension of the at least one connection element of the at least one second electrode set in the first direction is greater than the dimension of the third portions of the at least one connection element of the at least one first electrode set in the second direction.

8. A touch sensor as in claim 5, wherein at least one electrically insulating layer is formed between a first surface on which the electrodes of the at least one first electrode set are formed and a second surface on which the electrodes of the at least one electrode set are formed.

9. A touch sensor as in claim 1, wherein pairs of adjacent electrodes of the at least one first electrode set are coupled by transparent electrode connector portions formed from the first material in addition to being coupled by the at least one connection element of the respective first electrode set.

10. A touch sensor as in claim 1, wherein the at least one connection element of the at least one second electrode set is formed from the second material and comprises a first portion, a second portion, and a third portion, the third portion coupling the first portion and the second portion; wherein a projection of the first portion onto the substrate surface along a surface normal to the substrate surface is within a projection of a first one of the pair of electrodes coupled by the at least one connection element onto the substrate surface along the surface normal; wherein a projection of the second portion onto the substrate surface along the surface normal is within a projection of the second one of the pair of electrodes coupled by the at least one connection element onto the substrate surface along the surface normal; and wherein a dimension of the third portion in the first direction is smaller than a dimension of the first portion in the first direction and a dimension of the second portion in the first direction.

11. A touch sensor according to claim 10, wherein pairs of adjacent electrodes of the at least one second electrode set are coupled by transparent electrode connector portions formed from the first material in addition to being coupled by the at least one connection element.

12. A touch sensor according to claim 5, further comprising a control circuit, and a plurality of electrically conductive lines comprising the second material, each of the electrically conductive lines coupling the control circuit and at least one of the at least one first electrode set and the at least one the second electrode set.

13. A touch sensor according to claim 12, wherein each of the electrically conductive lines comprises a layer of the first material and a layer of the second material.

14. A touch sensor comprising:
   a substrate having a substrate surface; and
   at least one first electrode set comprising
      a plurality of electrodes over the substrate surface and arranged in a row along a first direction, and
      at least one connection element coupling a pair of adjacent ones of the plurality of electrodes,
      said at least one connection element comprising a first portion, a second portion, and a third portion, the third portion coupling the first portion and the second portion,
      the first portion having a projection onto the substrate surface being within a projection of a first one of the pair of electrodes coupled by the at least one connection element onto the substrate surface, the second portion having a projection onto the substrate surface being within a projection of the second one of a pair of electrodes coupled by the connection element onto the substrate surface, a dimension of the third portion in a second direction being smaller than a dimension of the first portion in the second direction and a dimension of the second portion in the second direction, with each of the first, second, and third portions having a rectangular shape, wherein a longer side of the first portion and a longer side of the second portion extend in the second direction, and wherein a longer side of the third portion extends in the first direction.

15. A touch sensor as in claim 14, wherein a dimension of the third portion in the first direction is greater than a dimension of the first portion in the first direction and a dimension of the second portion in the first direction.

16. A touch sensor as in claim 14, wherein at least one of a dimension of the first portion in the first direction, a dimension of the second portion in the first direction, and a dimension of the third portion in the second direction are less than or equal to 15 µm.

17. A touch sensor as in claim 14, wherein each of the electrodes of the at least one first set thereof has a rhombus shape, a first diagonal of the rhombus extending in the first direction, a second diagonal of the rhombus extending in the second direction.

18. A touch sensor as in claim 14, further comprising at least one second electrode set comprising a plurality of electrodes arranged in a row along the second direction, and being transparent and formed from the first material, and at least one connection element coupling a pair of adjacent ones of the plurality of electrodes.

19. A method of forming a touch sensor, comprising:
providing a substrate having a substrate surface; and
forming at leas one first electrode set by at least
forming a first of plurality of electrodes over the substrate surface, the electrodes being arranged in a row along a first direction, the electrodes comprising a first material being electrically conductive and light transmissive,
forming at least one connection element coupling a pair of adjacent ones of the plurality of electrodes, the at least one element comprising a second material having a lower specific electric resistance than the first material, the at least one connection element comprising a first portion, a second portion, and a third portion, the third portion coupling the first portion and the second position, a projection of the first portion onto the substrate surface along a surface normal to the substrate surface being within a projection of a first one of the pair of electrodes electrically connected by the connection element onto the substrate surface along the surface normal, a projection of the second portion onto the substrate surface along the surface normal being within a projection of a second one of the pair of electrodes connected by the connection element onto the substrate surface along the surface normal, a dimension of the third portion in a second direction perpendicular to the first direction and the surface normal being smaller than a dimension of the first portion in the second direction and a dimension of the second portion in the second direction, with each of the first, second, and third portions having-a rectangular shape, wherein a longer side of the first portion and a longer side of the second portion extend in the second direction, and wherein a longer side of the third portion extends in the first direction.

20. A method as in claim 19, wherein a dimension of the third portion in the first direction is greater than a dimension of the first portion in the first direction and a dimension of the second portion in the first direction.

21. A method as in claim 19, wherein at least one of a dimension of the first portion in the first direction, a dimension of the second portion in the first direction, and a dimension of the third portion in the second direction are less than or equal to 15 µm.

22. A method as in claim 19, wherein each of the electrodes of the at least one first set thereof has a rhombus shape, a first diagonal of the rhombus extending in the first direction, a second diagonal of the rhombus extending in the second direction.

* * * * *

UNITED STATES PATENT AND TRADEMARK OFFICE
CERTIFICATE OF CORRECTION

PATENT NO. : 8,698,029 B2  
APPLICATION NO. : 13/164394  
DATED : April 15, 2014  
INVENTOR(S) : Antonino Scuderi et al.

Page 1 of 1

It is certified that error appears in the above-identified patent and that said Letters Patent is hereby corrected as shown below:

In The Claims

Column 20, Line 8     Delete: "are"  
Claim 7               Insert --is--

Column 21, Line 38    Delete: "leas"  
Claim 19              Insert --least--

Signed and Sealed this  
Eleventh Day of August, 2015

Michelle K. Lee  
*Director of the United States Patent and Trademark Office*